United States Patent Office 2,809,828
Patented Oct. 15, 1957

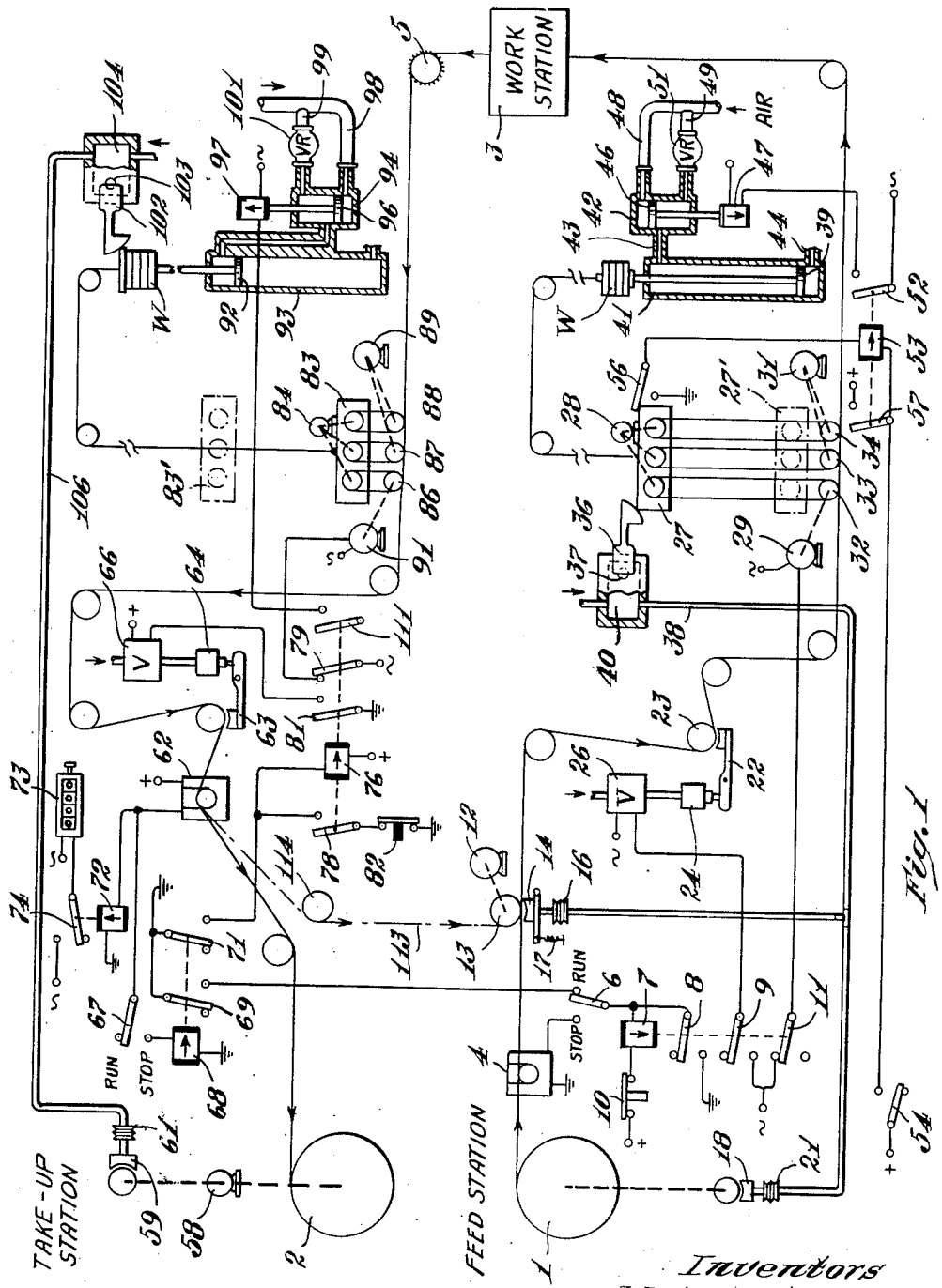

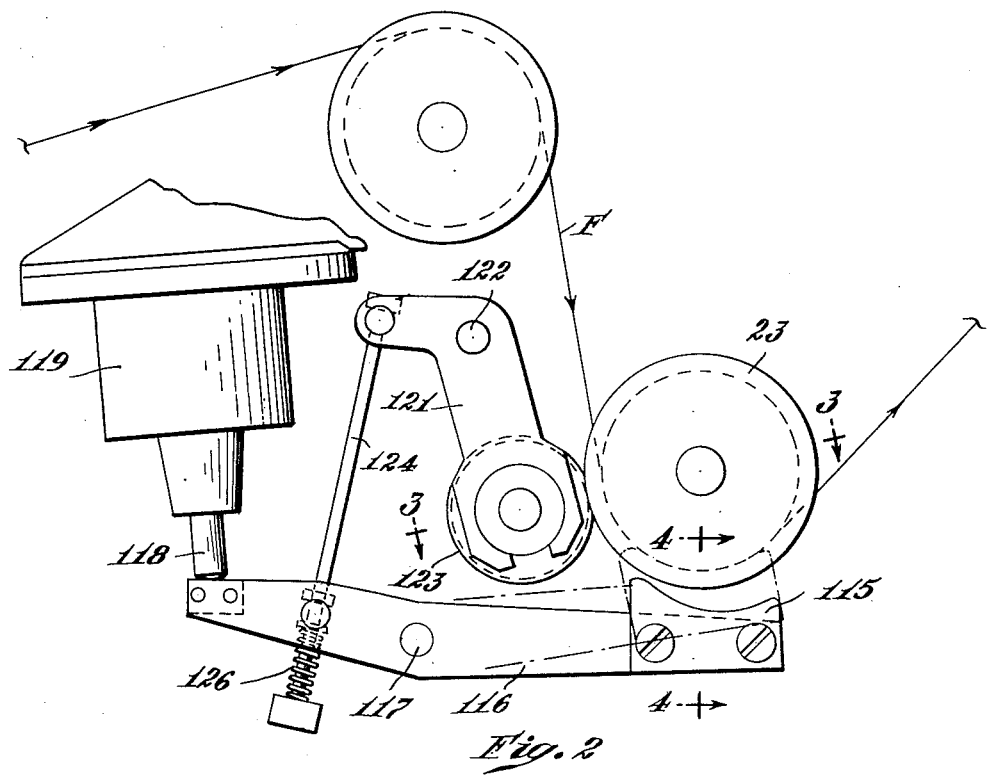
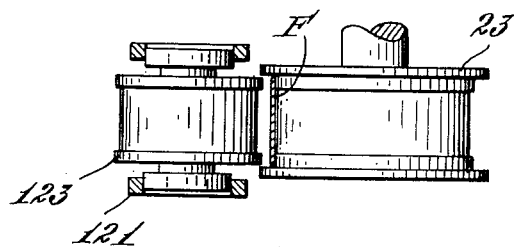
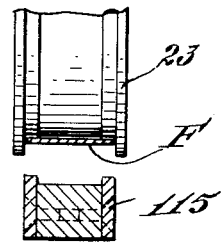

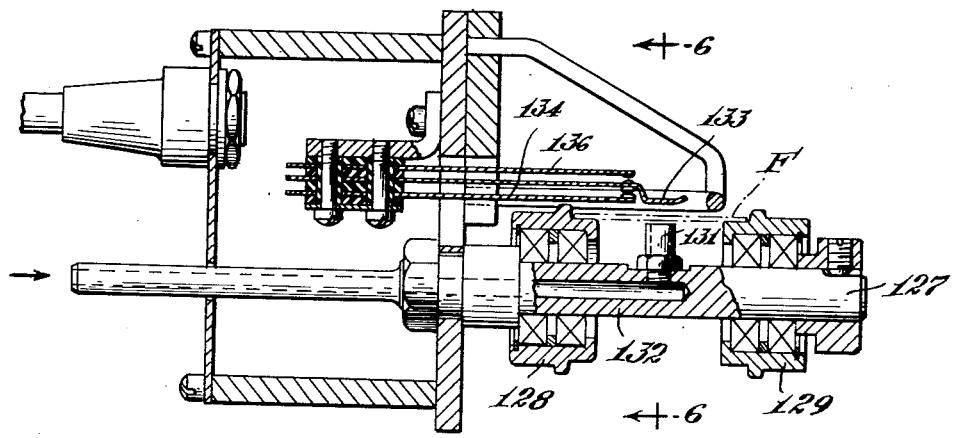
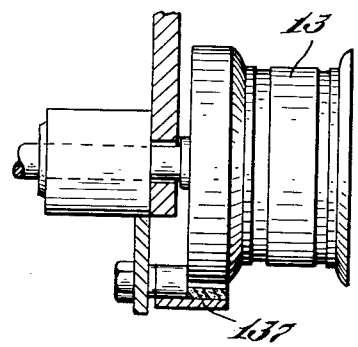
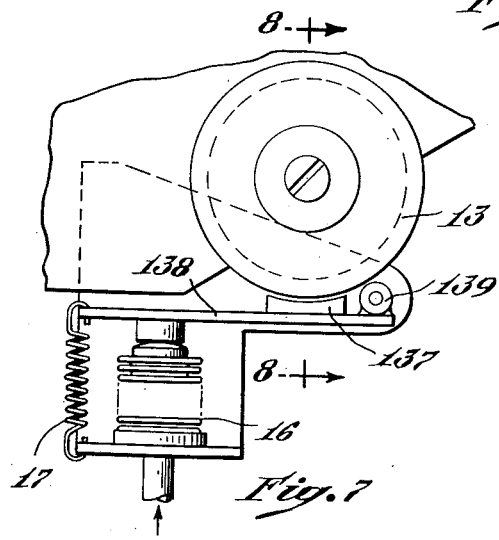
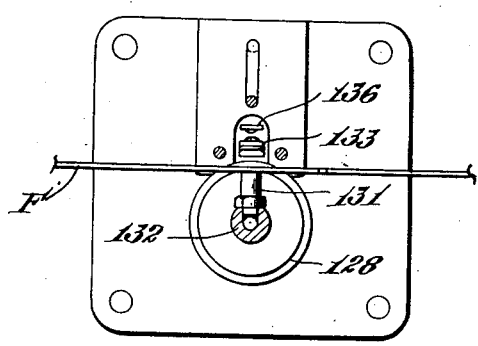

2,809,828

CINEMATOGRAPHIC FILM PROCESSING

Malcolm H. Ames and William B. Tucker, Los Angeles, Calif., assignors to Technicolor Corporation, Hollywood, Calif., a corporation of Maine Application March 21, 1955, Serial No. 495,532

14 Claims. (Cl. 271—2.2)

While this invention is particularly applicable to apparatus for printing pictures on one film from another film, as for example on positive stock from negative film, it is useful in any machine for processing cinematographic film.

Objects of the invention are to provide apparatus for processing film continually when fed either continuously or intermittently, to permit film to be spliced into the machine at one end and removed from the machine at the other end concomitantly and without interrupting the processing, to permit either recurrent printing from a loop negative or successive printing from different negatives spliced end to end, to increase the rate of processing, to reduce the danger of film breakage, to minimize film wear, and generally to improve machines of the type referred to.

In one aspect the present invention involves a machine having a film path including a splice station at which film may be spliced, a work station at which the film may be used or treated, as for example a printing station at which pictures may be printed from one film on another film, between the two stations a film elevator, at the splice station a detector responsive to an opening in the film or other cue on the film, between the elevator and splice station a brake for stopping the film, means responsive to the detector for setting the brake, an accelerating system to assist in restoring the elevator to normal position when the brake is released, at the splice station means for releating the brake, means for concomitantly activating the accelerating system, and means for automatically decelerating the film when the elevator is restored to normal position. The machine also preferably comprises a feed driver between the splice station and the elevator for propelling the film, together with means for stopping the driver in response to the aforesaid cue.

The aforesaid driver and brake may be located either at a feed station at which film is spliced into the machine or at a take-up station at which film is removed from the machine, and in the preferred embodiment they are located at both stations, in which case an elevator is associated with each station. Perferably the machine also comprises an accelerating system associated with each elevator to assist in restoring the elevator to normal position when the associated brake is released, together with means for activating the accelerating system when the associated brake is released, and means for automatically decelerating the film when the elevator is restored to normal position.

In another aspect the feed and take-up stations are juxtaposed and the machine is provided with means for feeding the film from the take-up station to the feed station to make said film path an orbital path in which a loop of film may travel continually round and round. In the preferred embodiment either the feed station or the take-up station, preferably the latter, is provided with means for shifting the control of the brake at the other station to the detector at the one station so that both brakes are under the control of the detector at the one station.

In another aspect the machine has a main film path including in succession a feed station at which film may be spliced into the machine, a feed elevator in which is stored a releasable supply of film, a work station, a take-up elevator for storing a supply of film, a take-up station at which film may be removed from the machine, with a connecting path between the elevators in which the film may be spliced end to end for operation in a loop passing through the work station, together with film stopping means between the connecting path and the elevators respectively, the stopping means being responsive to a cue mark on the film to stop film feed to and from said elevators respectively, thereby to permit the film to be disconnected from the feed and take-up stations and spliced in a loop or vice versa, without stopping film feed through the work station.

For the purpose of illustration a typical embodiment of the invention is shown in the accompanying drawings in which Fig. 1 is a diagrammatic view;
Fig. 2 is a side view of a film brake;
Fig. 3 is a section on line 3—3 of Fig. 2;
Fig. 4 is a section on line 4—4 of Fig. 2;
Fig. 5 is a sectional view of the aforesaid detector;
Fig. 6 is a section on line 6—6 of Fig. 5;
Fig. 7 is a side view of another brake; and
Fig. 8 is a section on line 8—8 of Fig. 7.

The particular embodiment of the invention chosen for the purpose of illustration comprises a feed station at which film is fed from a reel 1 along a main path ending at a take-up reel 2 at a take-up station. Along the path is a work station 3 which may comprise a contact printer for printing from the film on another film. While the film feeds through the work station at constant speed either intermittently or continuously depending on the work performed, the feed must be interrupted at the feed and take-up stations to splice in new film at the feed station and remove used film at the take-up station. Thus roll 5 is shown as a constant-speed driver sprocket.

The mechanism at the feed station comprises a detector 4 responsive to a cue on the film, a switch 6, a relay 7 controlling three switches 8, 9 and 11, a retardable torque-type motor 12 driving a booster roll 13, a variable brake 14 for retarding the booster roll 13, a bellows 16 for applying the brake 14 against the action of spring 17, a variable brake 18 for retarding the feed reel 1 when the feed elevator becomes full, bellows 21 for controlling the brake 18, a film roller 23, a positive brake 22 for clamping the film roller 23, a cylinder 24 for actuating the brake 22 and a valve 26 for admitting air under pressure to the cylinder 24.

Intermediate the feed station and the work station is a feed elevator 27 which is normally in the elevated position shown in full lines and which gradually descends toward the broken-line position 27' when the supply of film to the elevator is stopped. The rollers on the elevator are driven by a motor 28 and the rollers beneath the elevator are driven by two motors 29 and 31, the motor 29 driving the first row of rollers 32 and the motor 31 driving the other two rows of rollers 33 and 34. The speeds of the motors 29 and 31 and the connections between these motors and the rollers 32, 33 and 34 are preferably such that rollers 32, 33 and 34 run at speeds respectively 2.5, 1.8, and 1.2 times the speed of the film through the work station. When the elevator 27 is approximately in normal position it actuates a cam-actuated valve 36. The valve 36 controls the escape of air under pressure from a chamber 40. As the elevator rises it causes the valve partially to close a bleeder outlet 37, thereby to increase the pressure of air in a conduit 38 leading from the chamber 40 to the brakes 14 and 18 to retard the motor 12 and the feed reel 1.

To assist in lifting the elevator 27 a piston 39 and cylinder 41 are associated with a counterweight W. The cylinder is supplied with air through a chamber 42 and inlet 43, the lower end of the cylinder being provided with an outlet 44. In the chamber 42 is a valve 46 controlled by a solenoid 47. The chamber 42 is supplied with air through two inlets 48 and 49, the latter containing a pressure-reducing valve 51. Thus when the valve 46 is above the inlet 43, low-pressure air is supplied to the cylinder 41, and when the valve 46 is below the inlet 43 high-pressure air is supplied to the cylinder. The solenoid 47 is controlled by a switch 52 actuated by relay 53 which is controlled by three switches 54, 56 and 57. The weight W, together with the low-pressure in cylinder 41 should be sufficient to keep the elevator in elevated position so long as film feeds freely into the elevator.

At the take-up station the take-up reel 2 is driven by a retardable torque-type motor 58 associated with a variable brake 59 actuated by bellows 61. The take-up station also has a detector 62 corresponding to 4 at the feed station and clamping brake 63 corresponding to brake 22 at the feed station, the brake 63 being controlled by a cylinder 64 and a valve 66. Connected to the detector 62 through a switch 67 is a relay 68 controlling switches 69 and 71. Also connected to the detector is another relay 72 controlling a counter 73 through a switch 74. The takeup station is also provided with a relay 76 controlling switches 78, 79, 81 and 111. The relay 76 is controlled not only by the switch 71 but also by a manual switch 82.

Between the work station and the take-up station is a take-up elevator 83 which is normally in the lower position shown in full lines and which rises toward the broken-line position 83′ when the feed of the film from the elevator is stopped. The film rollers on the elevator are driven by a motor 84 and the rollers 86, 87 and 88 beneath the elevator are driven by two motors 89 and 91. As in the case of the feed elevator the speeds of the motors 89 and 91 and their driving connections with the rolls 86, 87 and 88 are such that the speeds of the rolls 86, 87 and 88 respectively are approximately 2.5, 1.8 and 1.2 times the speed of the film at the work station.

Associated with the take-up elevator 83 is a booster comprising piston 92 and cylinder 93. Air is supplied to the cylinder 93 through chamber 94 containing valve 96 which is controlled by solenoid 97. Air is supplied to the chamber 94 through two inlets 98 and 99, the latter containing a pressure-reducing valve 101. Also associated with the take-up elevator is a valve 102 for closing bleeder outlet 103 in an air chamber 104 when the elevator is returned to normal position, thereby to operate the brake 56 through conduit 106 as in the case of air chamber 40.

Instead of feeding film from a feed roll 1 and taking it up on a take-up roll 2 the film may be fed along an orbital path including the branch path 113 leading from the take-up detector 62 at the take-up station to the roll 13 at the feed station over a roll 114.

As shown in Figs. 2, 3 and 4 the preferred construction of the brakes 22 and 63 comprises a brake shoe 115 mounted on an arm 116 which is pivoted at 117. Bearing on the end of the arm opposite the shoe is a plunger 118 which is actuated by an air cylinder 119 such as indicated diagrammatically at 24 and 64 in Fig. 1. As shown in Fig. 4 the shoe 114 bears only on the margins of the film F. Adjacent the film roller is an arm 121 pivoted at 122. Rotatably mounted on the lower end of the arm is a roller 123 which bears only on the margins of the film. The upper end of the arm 121 is interconnected with the arm 116 through a link 124 and a spring 126 so that before the brake 114 is applied the roller 123 is yieldingly pressed against the film, thereby counteracting any tendency of the film to jump off the roller 23 when the brake is applied.

Each of the detectors 4 and 62 is preferably constructed as shown in Figs. 5 and 6 in which 127 is a stationary shaft upon which two rollers 128 and 129 are mounted, the margins of the film F bearing on the inner edges of the two rollers respectively. Disposed beneath the film path is an air nozzle 131 to which air is supplied through a duct 132 in shaft 127. Immediately over the nozzle 131 is a switch 133 which normally engages contact 134, but which is lifted into engagement with contact 136 when air from nozzle 131 impinges on leaf 133. Thus when a hole in the film passes over nozzle 131 switch 133 is momentarily lifted out of contact with 134 into contact with 136. If the relays controlled by the detectors are actuated by closing their circuits as illustrated in Fig. 1, the relays are connected between 133 and 134 so that the circuits are momentarily opened when film cues pass over the air nozzles respectively. When employing relay systems actuated by opening the circuits, for example the ground lead to the grid of a thyratron tube, the relays would be connected between leads 133 and 136 of the switch.

The brake 14 is preferably constructed as shown in Figs. 7 and 8 in which 137 is a brake shoe mounted on an arm 138 pivoted at 139 so that the shoe is pressed against the margin of the roll when air is admitted to the bellows 16. Brakes 18 and 61 may be similarly constructed.

When film is fed from the feed reel 1 to the take-up reel 2 a leader is first threaded through the machine and the film is spliced to the end of the leader at the feed station. The machine is started by closing the main switch through which current is supplied to the machine. The detector switches 6 and 67 may be in either the Run position shown in Fig. 1 or in the Stop positions in which the relays 7 and 68 are connected to the detectors, and if they are not already in Stop position when the machine is started they are moved to Stop position promptly thereafter. Then when a cue opening at the end of the film passes the detector 4 at the feed station the relay 7 is energized to throw the switches 8, 9 and 11 to their lower positions. Switch 8 closes a holding circuit which keeps the relay energized until the switch 10 is subsequently opened. Switch 11 opens the circuit of motor 29 to stop the motor. Switch 9 closes the circuit to the valve 26 to admit air to the cylinder 24, thereby to apply the brake 22 and quickly stop the film. When the motor 29 stops the elevator 27 starts down, thereby opening the bleeder valve 36 to reduce the pressure in bellows 21 and thereby release the brake 18. The descent of the elevator also closes the switch 56.

After a new reel of film has replaced reel 1 and the new film has been spliced to the end of the old film the switch 10 is opened momentarily and the switch 54 is closed momentarily, and for this purpose the two switches may be interconnected for conjoint operation. Switch 10 breaks the holding circuit for relay 7, permitting the switches 8, 9 and 10 to resume the normal positions shown in Fig. 1, thereby releasing the brake 22 and starting the motor 29.

When switch 54 is closed, switch 56 already having been closed when the elevator descended, the relay 53 is energized. Switch 57 closes a holding circuit for the relay through switch 56 which remains closed until the elevator returns to elevated position. Switch 52 energizes solenoid 47 to move valve 46 below the inlet 43, thereby increasing the pressure in cylinder 41 to assist in returning the elevator 27 to raised position. When the elevator is restored to normal position it opens switch 56 to break the holding circuit of relay 53, thereby de-energizing the relay and the solenoid 47 to reduce the pressure in cylinder 41 to normal value. The return of elevator 27 to normal position also closes the bleeder valve to the extent necessary to apply the brake 18 and retard the feed reel to normal speed.

When the cue opening at the end of a film reaches the detector 62 at the take-up station, relay 68 is energized thereby to move the switches 69 and 71 to right-hand position. With switch 6 at the feed station still in Stop position switch 69 produces no effect. However, switch 71 energizes relay 76 thereby to throw switches 78, 79, 81 and 111 to their right-hand positions. Switch 78 closes a holding circuit for relay 76 through the switch 82. Switch 79 opens the circuit of motor 91 to stop the motor. Switch 81 opens the valve 66 to admit air to the cylinder 64 thereby to set the brake 63 and stop the film quickly. Switch 111 energizes solenoid 97 to change the air pressure in cylinder 93 from low to high, thereby to assist in lifting the elevator 83. When the film stops feeding to the take-up station, the take-up elevator 83 starts to rise and the piston 92 starts to descend.

After the film has been disconnected from the following film and the latter has been connected to a new reel 2, the switch 82 is opened momentarily. Opening switch 82 breaks the holding circuit for relay 76 and de-energization of this relay releases brake 63 and starts motor 91. When the elevator reaches normal position the bleeder valve 103 is partly closed to increase the pressure in bellows 61, thereby to retard the action of booster motor 58.

Sometimes it is desirable to run the same film through the machine repeatedly, as for example when making a number of prints from the same film, and for this reason the feed and take-up stations are preferably at the same location. In such cases the ends of the film are spliced together and the endless film travels in an orbital path including the branch portion 113 leading from detector 62 to the booster roll 13. For this loop operation both of the switches 6 and 67 are placed in the Run positions shown in Fig. 1, thus rendering both of the detectors 4 and 62 inoperative, except in that counter 73 is operated once each time the cue opening at the end of the film passes the detector 62. After the film has traveled around its orbital path the desired number of times minus one, the switch 67 is moved from Run position to Stop position. Then when the cue opening at the end of the film reaches detector 62 again, the relay 68 is energized to close switches 69 and 71. Switch 71 stops the feed of film from the take-up elevator as before and, with switch 6 still in Run position, switch 69 operates relay 7 to stop the feed of film to the feed elevator 27 as before. While thus stopped the ends of the film may be disconnected from each other and connected to films on reels 1 and 2, after which switches 10, 54, 82 and 112 may be closed momentarily as before to resume operation.

It should be understood that the present disclosure is for the purpose of illustration only and that this invention includes all modifications and equivalents which fall within the scope of the appended claims.

We claim:

1. A cinematographic machine having a film path including a splice station at which film may be spliced, a work station, between said stations a film elevator, at said splice station a detector responsive to a cue on the film, at the end of the elevator nearer the splice station a feed driver for propelling film, means responsive to said detector for stopping the driver, an accelerating system to assist in restoring the elevator to normal position when the driver starts, at the splice station means for starting the driver and means for concomitantly activating the accelerating system, and means controlled by movement of the elevator for automatically deactivating the accelerating system when the elevator is restored to normal position.

2. A cinematographic machine having a film path including a splice station at which film may be spliced, a work station, between said stations a film elevator, at said splice station a detector responsive to a cue on the film, at the end of the elevator nearer the splice station a feed driver for propelling film, between said detector and driver a brake for stopping the film, means responsive to said detector for simultaneously stopping the driver and setting the brake, an accelerating system to assist in restoring the elevator to normal position when the driver starts, at the splice station means for releasing the brake and starting the driver and means for concomitantly activating the accelerating system, and means controlled by movement of the elevator for automatically deactivating the accelerating system when the elevator is restored to normal position.

3. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, means responsive to said feed detector for stopping the feed driver, at the take-up station a take-up detector responsive to a cue on the film, at the outlet end of the take-up elevator a take-up driver for propelling film from the take-up elevator, and means responsive to said take-up detector for stopping the take-up driver.

4. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, between said feed detector and driver a feed brake for stopping the film, means responsive to said feed detector for simultaneously stopping the feed driver and setting the feed brake, at the take-up station a take-up detector responsive to a cue on the film, at the outlet end of the take-up elevator a take-up driver for propelling film from the take-up elevator, between said take-up detector and driver a take-up brake for stopping the film, and means responsive to said take-up detector for simultaneously stopping the take-up driver and setting the take-up brake.

5. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, between said feed detector and feed elevators a feed brake for stopping the film, means responsive to said feed detector for setting the feed brake, a feed booster to assist in restoring the feed elevator to normal position when the feed brake is released, at the feed station means for releasing the feed brake, means for accelerating the feed booster, means controlled by movement of the feed elevator for automatically decelerating the feed booster when the feed elevator is restored to normal position, at the take-up station a take-up detector responsive to a cue on the film, between said take-up detector and take-up elevator a take-up brake for stopping the film, means responsive to said take-up detector for setting the take-up brake, at the take-up station means for releasing the take-up brake and starting the take-up driver, means for accelerating the removal of film from the take-up elevator, and means controlled by movement of the take-up elevator for automatically decelerating the film when the take-up elevator is restored to normal position.

6. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, means responsive to said feed detector for stopping the feed driver, a feed accelerating system to assist in restoring the feed elevator to normal position when the feed driver starts, at the feed station means for starting the feed driver and means for concomitantly activating the feed accelerating system, means controlled by movement of the feed elevator for automatically deactivating the feed accelerating system when the feed elevator is restored to normal position, at the take-up station a take-up detector responsve to a cue on the film, at the outlet end of the take-up elevator a take-up driver for propelling film from the take-up elevator, means responsive to said take-up detector for stopping the take-up driver, at the take-up station means for starting the take-up driver and means for concomitantly accelerating the film, and means controlled by movement of the take-up elevator for automatically decelerating the film when the take-up elevator is restored to normal position.

7. A cinematographic machine having a film path including in succession a feed station at which film may be spliced into the machine, a feed elevator, a work station, a take-up elevator and a take-up station at which the film may be removed from the machine, at the feed station a feed detector responsve to a cue on the film, at the inlet end of the feed elevator a feed driver for propelling film from the feed station, between said feed detector and driver a feed brake for stopping the film, means responsive to said feed detector for simultaneously stopping the feed driver and setting the feed brake, a feed accelerating system to assist in restoring the feed elevator to normal position when the feed driver starts, at the feed station means for releasing the feed brake and starting the feed driver, means for activating the feed accelerating system, means controlled by movement of the feed elevator for automatically deactivating the feed accelerating system when the feed elevator is restored to normal position, at the take-up station a take-up detector responsive to a cue on the film, at the outlet end of the take-up elevator a take-up driver for propelling film from the take-up elevator, between said take-up detector and driver a take-up brake for stopping the film, means responsive to said take-up detector for simultaneously stopping the take-up driver and setting the take-up brake, and means to assist in restoring the take-up elevator to normal position when the take-up driver starts, at the take-up station means for releasing the take-up brake and starting the take-up driver, means for activating the take-up accelerating system and means controlled by movement of the take-up elevator for automatically deactivating the take-up accelerating system when the take-up elevator is restored to normal position.

8. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, between said feed detector and feed elevator a feed brake for stopping the film, means responsive to said feed detector for setting the brake, at the take-up station a take-up detector responsive to a cue on the film, between said take-up elevator and take-up detector a take-up brake for stopping the film, means responsive to said take-up detector for setting the take-up brake, said feed and take-up stations being juxtaposed, means for feeding film from the take-up station to the feed station to make said path an orbital path in which a loop of film may travel continually round and round, and at one of said stations means for shifting the control of the brake at the other station to the detector at the one station so that both brakes are under the control of the detector at the one station.

9. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, means responsive to said feed detector for stopping the feed driver, at the take-up station a take-up detector responsive to a cue on the film, at the outlet end of the take-up elevator a take-up driver for propelling film from the take-up elevator, means responsive to said take-up detector for stopping the take-up driver, said feed and take-up stations being juxtaposed, means for feeding film from the take-up station to the feed station to make said path an orbital path in which a loop of film may travel continually round and round, and at one of said stations means for shifting the control of the driver at the other station to the detector at the one station so that both drivers are under the control of the detector at the one station.

10. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, between said feed detector and driver a feed brake for stopping the film, means responsive to said feed detector for simultaneously stopping the feed driver and setting the brake, at the take-up station a take-up detector responsive to a cue on the film, at the outlet end of the take-up elevator a take-up driver for propelling film from the take-up elevator, between said take-up detector and driver a take-up brake for stopping the film, means responsive to said take-up detector for stopping the take-up driver and setting the take-up brake, said feed and take-up stations being juxtaposed, and means for feeding film from the take-up station to the feed station to make said path an orbital path in which a loop of film may travel continually round and round.

11. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, between said feed detector and feed elevator a feed brake for stopping the film, means responsive to said feed detector for setting the brake, at the take-up station a take-up detector responsive to a cue on the film, between said take-up elevator and detector a take-up brake for stopping the film, means responsive to said take-up detector for setting the take-up brake, said feed and take-up stations being juxtaposed, means for feeding film from the take-up station to the feed station to make said path an orbital path in which a loop of film may travel continually round and round, and at one of said stations means for shifting the control of the brake at the other station to the detector at the one station so that both brakes are under the control of the detector at the one station.

12. A cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, means responsive to said feed detector for stopping the feed driver, at the take-up station a take-up detector responsive to a cue on the film, at the outlet end of the take-up elevator a take-up driver for propelling film from the take-up elevator, means responsive to said take-up detector for stopping the take-up driver, said feed and take-up stations being juxtaposed, means for feeding film from the take-up station to the feed station to make said path an orbital path in which a loop of film may travel continually round and round, and at one of said stations means for shifting the control of the driver at the other station to the detector at the one station so that both drivers are under the control of the detector at the one station.

13. Cinematographic machine having a film path including in succession a feed station at which film may be spliced into the machine, a feed elevator, a work station, a take-up elevator and a take-up station at which the film may be removed from the machine, at the feed station a feed detector responsive to a cue on the film, at the inlet end of the feed elevator a feed driver for propelling film from the feed station, between said feed detector and driver a feed brake for stopping the film, means responsive to said feed detector for simultaneously stopping the feed driver and setting the brake, at the take-up station a take-up detector responsive to a cue on the film, at the outlet end of the take-up elevator a take-up driver for propelling film from the take-up elevator, between said take-up detector and driver a take-up brake for stopping the film, means responsive to said take-up detector for simultaneously stopping the take-up driver and setting the take-up brake, said feed and take-up stations being juxtaposed, means for feeding film from the take-up station to the feed station to make said path an orbital path in which a loop of film may travel continually round and round, and at one of said stations means for shifting the control of the driver and brake at the other station to the detector at the one station so that both drivers and brakes are under the control of the detector at the one station.

14. A cinematographic machine for film having a cue at one end thereof, the machine having a main film path including in succession a feed station at which film may be spliced into the machine, a feed elevator in which is stored a releasable supply of film, a work station, a take-up elevator for storing a supply of film, a take-up station at which film may be removed from the machine, with a connecting path between said elevators in which the film may be spliced end to end for operation in a loop passing through said work station, and film stopping means between said connecting path and said elevators respectively, said means being responsive to said cue mark to stop film feed to and from said elevators respectively, thereby to permit said film to be disconnected from said feed and take-up stations and spliced in a loop, or vice versa, without stopping film feed through said work station.

References Cited in the file of this patent

UNITED STATES PATENTS

| | | |
|---|---|---|
| 1,951,844 | Rose | Mar. 20, 1934 |
| 2,007,614 | Prentice | July 9, 1935 |
| 2,062,008 | Lewis et al. | Nov. 24, 1936 |
| 2,280,943 | Ferm | Apr. 28, 1942 |
| 2,290,447 | Price | July 21, 1942 |
| 2,494,402 | Mursch | Jan. 10, 1950 |